(12) United States Patent
Tsutsui

(10) Patent No.: US 9,693,209 B2
(45) Date of Patent: Jun. 27, 2017

(54) BASE STATION, COMMUNICATION METHOD, AND MOBILE STATION

(71) Applicant: NEC Corporation, Tokyo (JP)

(72) Inventor: Takahiro Tsutsui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/655,073

(22) PCT Filed: Dec. 9, 2013

(86) PCT No.: PCT/JP2013/082967
§ 371 (c)(1),
(2) Date: Jun. 24, 2015

(87) PCT Pub. No.: WO2014/103681
PCT Pub. Date: Jul. 3, 2014

(65) Prior Publication Data
US 2015/0350863 A1 Dec. 3, 2015

(30) Foreign Application Priority Data
Dec. 26, 2012 (JP) .................................. 2012-281977

(51) Int. Cl.
*H04W 4/22* (2009.01)
*H04W 28/02* (2009.01)
*H04W 88/08* (2009.01)
*H04W 4/06* (2009.01)

(52) U.S. Cl.
CPC ......... *H04W 4/22* (2013.01); *H04W 28/0236* (2013.01); *H04W 4/06* (2013.01); *H04W 88/08* (2013.01)

(58) Field of Classification Search
CPC ... H04W 76/007; H04W 4/22; H04W 68/005; H04W 72/005; H04M 2242/04
(Continued)

(56) References Cited

U.S. PATENT DOCUMENTS 9,224,161 B2 * 12/2015 Preston ................ G06Q 20/102
2009/0130972 A1 * 5/2009 Andersen .............. H04W 8/245
455/3.01
(Continued)

FOREIGN PATENT DOCUMENTS

JP 2002-368684 12/2002

OTHER PUBLICATIONS

International Search Report PCT/JP2013/082967 dated Feb. 25, 2014.
(Continued)

*Primary Examiner* — Kimberly A Williams
(74) *Attorney, Agent, or Firm* — Young & Thompson

(57) ABSTRACT

A base station communicates with a mobile station. The base station includes a wireless communication unit and a control unit. The wireless communication unit transmits an alert periodically to the mobile station using a first channel, receives, from the mobile station, alert reception information related to reception of the alert, and transmits at least a part of the alert to the mobile station using a second channel different from the first channel. The control unit instructs the wireless communication unit, in response to the alert reception information, to transmit to the mobile station at least a part of the alert using the second channel.

17 Claims, 14 Drawing Sheets

(58) Field of Classification Search
USPC .......... 455/404.1, 414.1–414.3; 340/6.1, 7.2, 340/7.58, 7.59; 379/37, 47, 49
See application file for complete search history.

(56) References Cited

U.S. PATENT DOCUMENTS

| | | | |
|---|---|---|---|
| 2009/0227224 A1* | 9/2009 | Aftelak | H04M 11/04 455/404.2 |
| 2009/0239497 A1* | 9/2009 | Sennett | H04W 76/007 455/404.1 |
| 2011/0059748 A1* | 3/2011 | Taylor | H04W 4/02 455/456.1 |
| 2011/0250862 A1* | 10/2011 | Schliwa-Bertling | H04W 76/007 455/404.1 |
| 2012/0295536 A1* | 11/2012 | Klatt | H04W 4/021 455/3.01 |

OTHER PUBLICATIONS

LG Electronics, ETWS Support in Release 8, 3GPP TSG-RAN WG2#61bis R2-081515, Apr. 4, 2008.
3GPP TS 23.041, "Technical realization of Cell Broadcast Service (CBS) (Release 11)", V11.4.0 (Sep. 2012).
3GPP TS 36.331, "Radio Resource Control (RRC) Protocol Specification (Release 11)", V11.1.0 (Sep. 2012).
3GPP TS 36.413, "S1 Application Protocol (S1AP) (Release 11)", V11.1.0 (Sep. 2012).

* cited by examiner

US 9,693,209 B2

BASE STATION, COMMUNICATION METHOD, AND MOBILE STATION

TECHNICAL FIELD

The present invention relates to a base station that controls transmission of alerts, a communication method, and a mobile station.

BACKGROUND ART

Standard-setting organizations such as 3GPP (3rd generation partnership program) are considering and standardizing PWS (public warning system), which is a platform for transmitting emergency information. PWS regulates functions for notification or transmission of warning notification (hereunder, referred to as alert) to several mobile stations (UE: user equipment). PWS is classified into ETWS (earthquake and tsunami warning system) and CMAS (commercial mobile alert system).

Non-patent Document 1 discloses a sequence of alert notification performed by means of PWS. An example sequence of an alert notification is described, with reference to FIG. 14.

A CBS (cell broadcast service) 50 notifies a CBC (cell broadcast center) 40 of alert content, notification area, and notification period, using an emergency broadcast request message (step S1001). Based on the received information such as notification area, the CBC 40 identifies an MME (mobility management entity) 30 to which a write-replace warning request is to be transmitted. The CBC 40 notifies the identified MME 30 of the alert content, the notification area, and the notification period, using a write-replace warning request message (step S1002). Upon receiving the alert content, the notification area, and the notification period, the MME 30 notifies the CBC 40 of information that indicates these pieces of information as having been received, using a write-replace warning response message (step S1003).

Furthermore, based on the received information such as notification area, the MME 30 identifies a base station (eNB: eNodeB) 20 that performs alert notification. The MME 30 notifies the identified base station 20 of the alert content, the notification area, and the notification period, using a write-replace warning request message (step S1004). The base station 20 identifies the cell that performs notification, based on the notification area. Moreover, the base station 20 notifies the mobile station 10 of the identified cell of the alert content, using SIB (system information block) 12 (SIB type-12) of BCCH (broadcast control channel) (step S1005). If another alert is being notified to the mobile station 10, the eNB 20 performs notification of several alerts in a time divisional manner. The mobile station 10 receives the alert notified by the eNB 20. Non-patent Document 2 discloses that alerts can be transmitted in a manner of being divided into several segments.

The notification cycle of an alert to be notified to the mobile station 10 by the base station 20 is regulated as a repetition period or extended repetition period in Non-patent Document 3. The notification cycle of an alert is set in a range between 1 second to 131071 seconds.

PRIOR ART DOCUMENTS

Non-Patent Documents

[Non-patent Document 1] 3GPP TS 23.041, "Technical realization of Cell Broadcast Service (CBS) (Release 11)", V. 11.4.0. (September 2012).

[Non-patent Document 2] 3GPP TS 36.331, "Radio Resource Control (RRC) Protocol Specification (Release 11)", v. 11.1.0 (September 2012).

[Non-patent Document 3] 3GPP TS 36.413, "S1 Application Protocol (SLAP) (Release 11)", v. 11.1.0 (September 2012).

SUMMARY OF THE INVENTION

Problem to be Solved by the Invention

As mentioned above, in PWS, alerts are notified periodically. For example, in some cases, the mobile station 10 may fail to receive an alert because of deteriorated reception quality in a wireless link. If it fails to receive an alert, the mobile station 10 needs to wait to receive an alert until the next opportunity for the base station 20 to perform transmission, that is, until one cycle has elapsed. Consequently, there arises a problem in that alert reception is delayed in the mobile station 10.

An example of an object of the present invention is to provide a base station, a communication method, and a mobile station, capable of suppressing alert reception delay in a mobile station.

Means for Solving the Problem

A base station according to an exemplary aspect of the present invention communicates with a mobile station. The base station includes a wireless communication unit and a control unit. The wireless communication unit transmits an alert periodically to the mobile station using a first channel, receives, from the mobile station, alert reception information related to reception of the alert, and transmits at least a part of the alert to the mobile station using a second channel different from the first channel. The control unit instructs the wireless communication unit, in response to the alert reception information, to transmit to the mobile station at least a part of the alert using the second channel.

A communication method according to an exemplary aspect of the present invention for a base station communicating with a mobile station, the communication method including: transmitting an alert periodically to the mobile station using a first channel; receiving, from the mobile station, alert reception information related to reception of the alert; transmitting at least a part of the alert to the mobile station using a second channel different from the first channel; and instructing the base station, in response to the alert reception information, to transmit to the mobile station at least a part of the alert using the second channel.

A mobile station according to an exemplary aspect of the present invention communicates with a base station. The mobile station includes: a wireless communication unit a control unit. The wireless communication unit receives an alert periodically from the base station using a first channel, transmits, to the base station, alert reception information related to reception of the alert, and receives at least a part of the alert from the base station using a second channel different from the first channel. The control unit decodes the alert, determines whether the alert is correctly decoded, and instructs the wireless communication unit to transmit the alert reception information to the base station in a case of the control unit determining that the alert is correctly decoded.

Effect of the Invention

According to an exemplary embodiment of the present invention, it is possible to suppress delay in alert reception in the mobile station.

EMBODIMENTS FOR CARRYING OUT THE INVENTION

Exemplary embodiments of the present invention are described, with reference to the drawings. The exemplary embodiments of the present invention do not limit the technical scope of the present invention.

[First Exemplary Embodiment]

Figure 1:
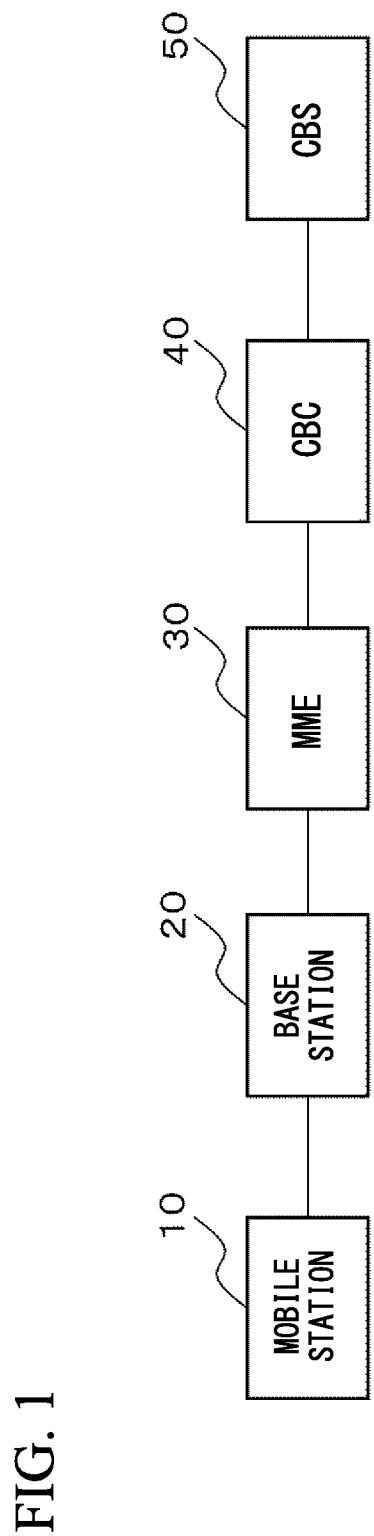
FIG. 1 is a block diagram showing a configuration of a communication system according to an exemplary embodiment of the present invention.

A communication system in a first exemplary embodiment of the present invention is described, with reference to FIG. 1.

The communication system in the first exemplary embodiment includes a mobile station 10, a base station 20, an MME 30, a CBC 40, and a CBS 50. FIG. 1 only shows a single mobile station 10. However, there may be provided a plurality of mobile stations 10.

Figure 2:
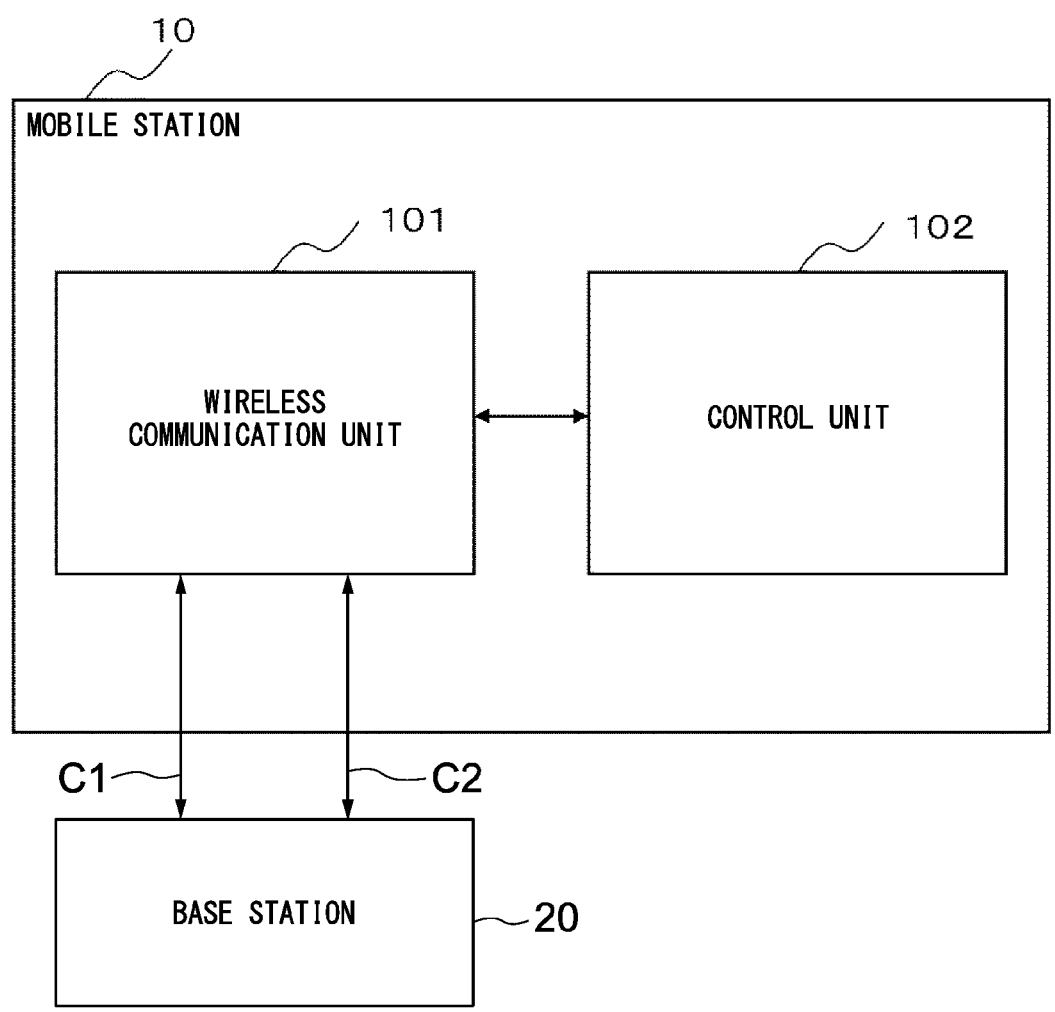
FIG. 2 is a block diagram showing a configuration of a mobile station according to a first exemplary embodiment of the present invention.

FIG. 2 shows a configuration of the mobile station 10. The mobile station 10 has a wireless communication unit 101 and a control unit 102. The wireless communication unit 101 receives an alert transmitted from the base station 20, through a first channel (first frequency band) C1 or a second channel (second frequency band) C2. The control unit 102 determines whether or not the alert received by the wireless communication unit 101 through the first channel C1 has been correctly decoded. In the case where the control unit 102 determines that the alert has not been received correctly, it causes the wireless communication unit 101 to transmit, to the base station 20, information related to alert reception (hereunder, referred to as alert reception information) through the first channel C1. Determination of decoding may be performed by means of a CRC (cyclic redundancy check) method or the like, or it may be performed by means of another error detection method.

The mobile station 10 communicates with the base station 20 via a wireless link. The mobile station 10 has functions for generating RRC (radio resource control) messages for wireless resource control, and for determining parameters related to RRC messages. Moreover, the mobile station 10 has a function for notifying an upper layer of an alert.

Figure 3:
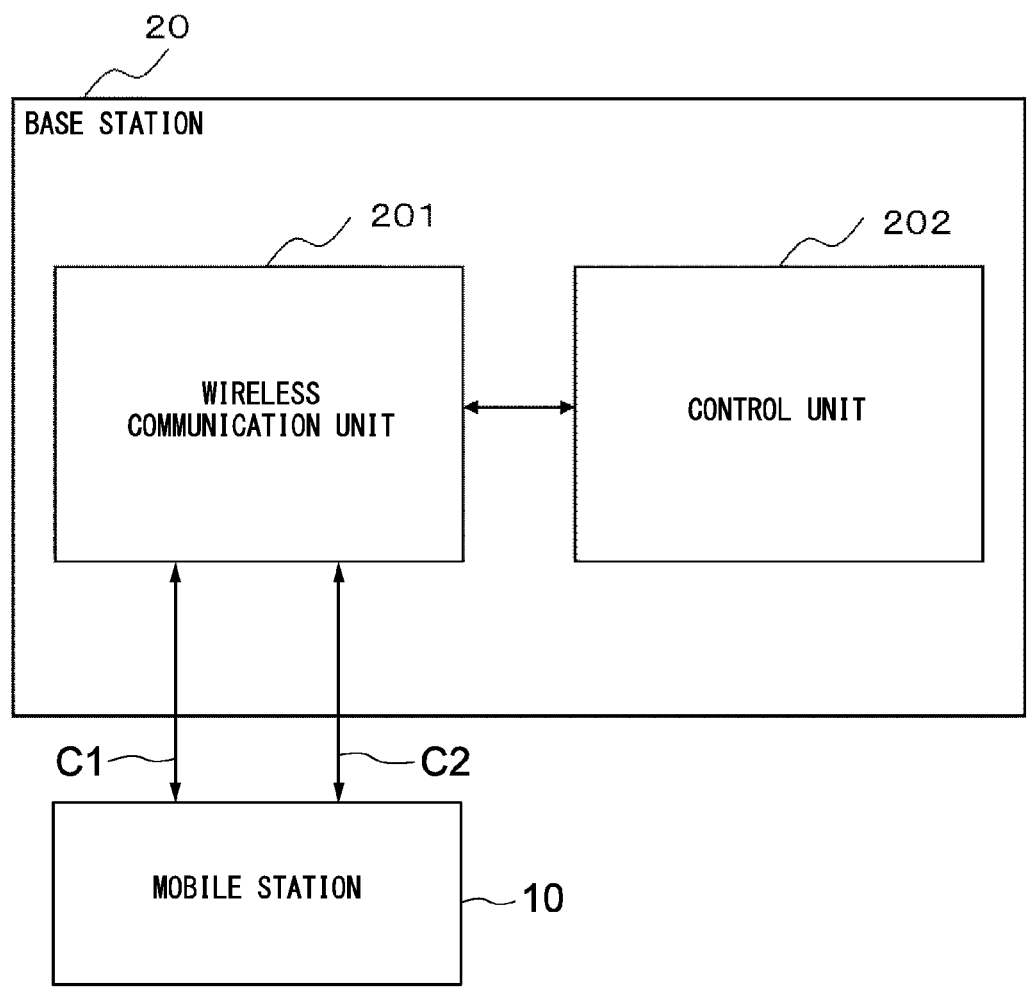
FIG. 3 is a block diagram showing a configuration of a base station according to the first exemplary embodiment of the present invention.

FIG. 3 shows a configuration of the base station 20. The base station 20 has a wireless communication unit 201 and a control unit 202. The wireless communication unit 201 notifies the mobile station 10 of an alert and transmits it to the mobile station 10 through the first channel C1 or the second channel C2. The wireless communication unit 201 receives alert reception information. In the case where the wireless communication unit 201 receives alert reception information, the control unit 202 causes the wireless communication unit 201 to use the second channel C2 to notify or transmit the alert to the mobile station 10.

The base station 20 communicates also with the MME 30 via an S1 interface. The base station 20 also has functions described below. It has functions for generating RRC messages for wireless resource control, and for determining parameters related to RRC messages. Moreover, the base station 20 has functions for generating S1-AP (S1 application) messages for wireless resource control, and for determining parameters related to S1-AP messages.

The MME 30 is one of the nodes that constitute a core network, and communicates with the base station 20 via the S1 interface. The core network is configured with a CBC 40 and a CBS 50, in addition to the MME 30.

Figure 4:
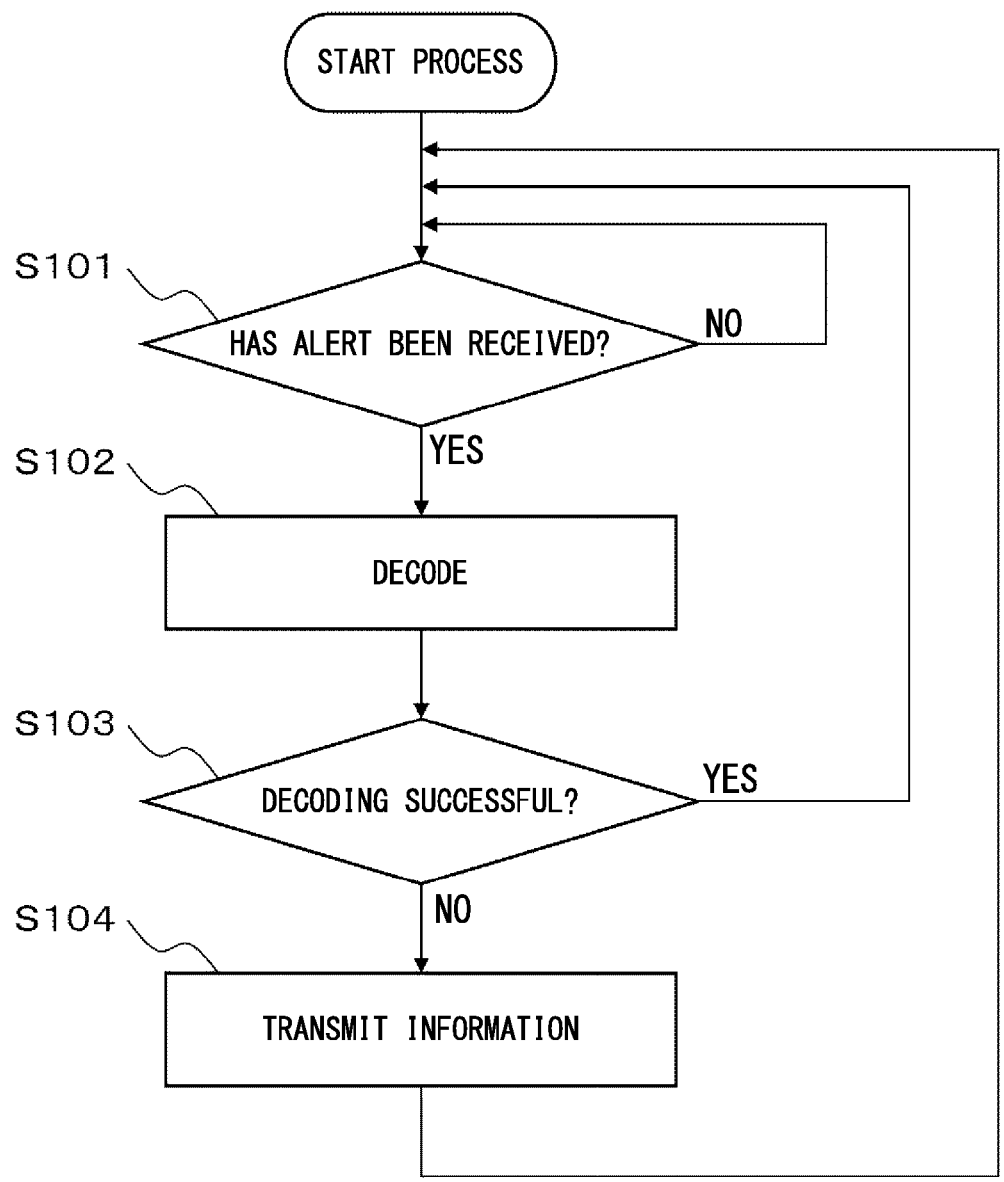
FIG. 4 is a flowchart showing an operation of the mobile station according to the first exemplary embodiment of the present invention.

Next, operations of the mobile station 10 in the first exemplary embodiment are described, with reference to FIG. 4. First, the control unit 102 determines whether or not an alert has been received from the base station 20 through the first channel C1 (step S101). If an alert has been received ("YES" in step S101), the control unit 102 decodes the received alert (step S102). If an alert has not been received ("NO" in step S101), the control unit 102 returns to the process of step S101. The control unit 102 determines whether or not decoding has succeeded after step S102 (step S103). If decoding has succeeded ("YES" in step S103), the control unit 102 returns to the process of step S101. If decoding has not succeeded ("NO" in step S103), the control unit 102 causes the wireless communication unit 101 to transmit alert reception information to the base station 20 (step S104), and returns to the process of step S101.

Figure 5:
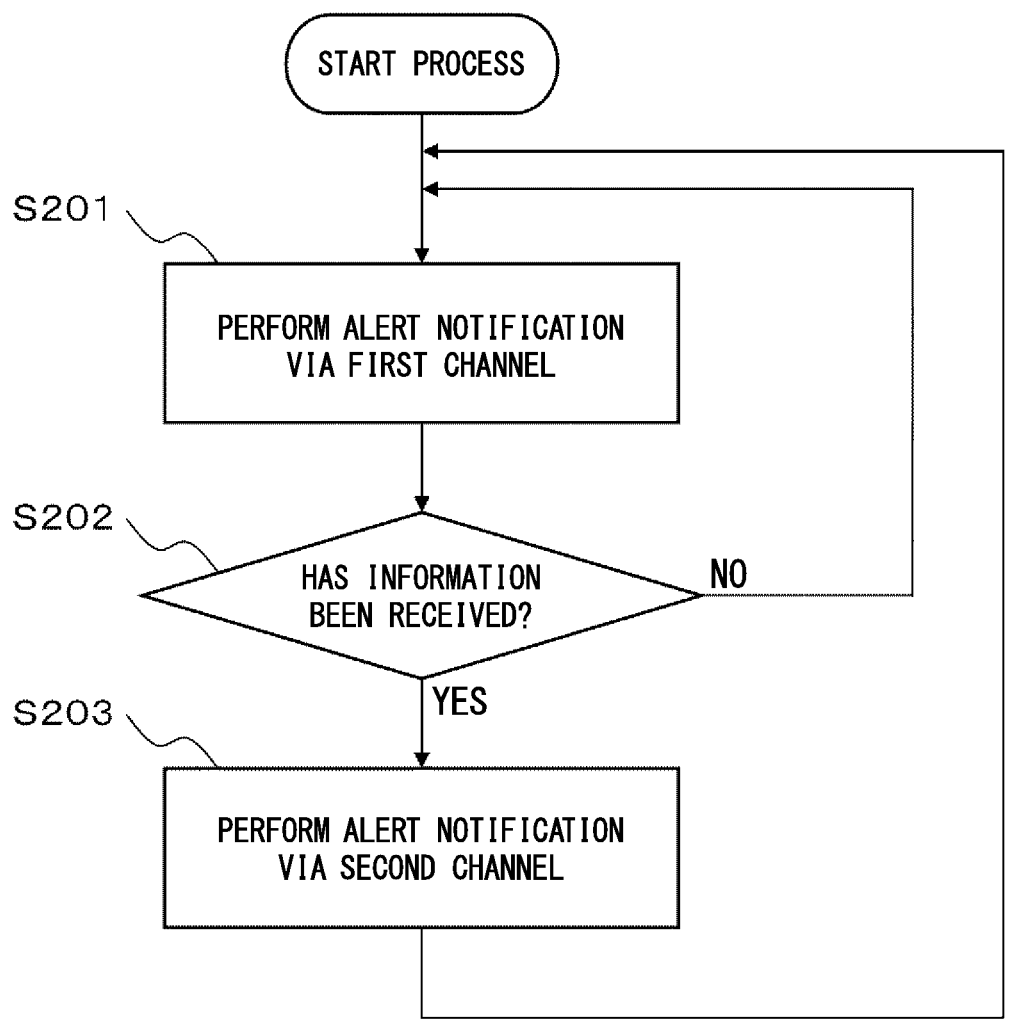
FIG. 5 is a flowchart showing an operation of the base station according to the first exemplary embodiment of the present invention.

Next, operations of the base station 20 in the first exemplary embodiment are described, with reference to FIG. 5. First, the wireless communication unit 201 notifies (transmits to) the mobile station 10 of an alert, using the first channel C1 (step S201). Subsequently, the control unit 202 determines whether or not alert reception information has been received from the mobile station 10 (step S202). If alert reception information has been received ("YES" in step S202), the control unit 202 causes the wireless communication unit 201 to use the second channel C2 to notify of (transmit) a wireless communication unit alert. If alert reception information has not been received, the control unit 202 returns to the process of step S201, and causes the wireless communication unit 201 to use the first channel C1 to notify (transmit to) the mobile station 10 of an alert at a constant period. In step S203, the second channel C2 is used to notify (transmit to) the mobile station 10 of an alert, and then, the process returns to the process of step S201.

Figure 6:
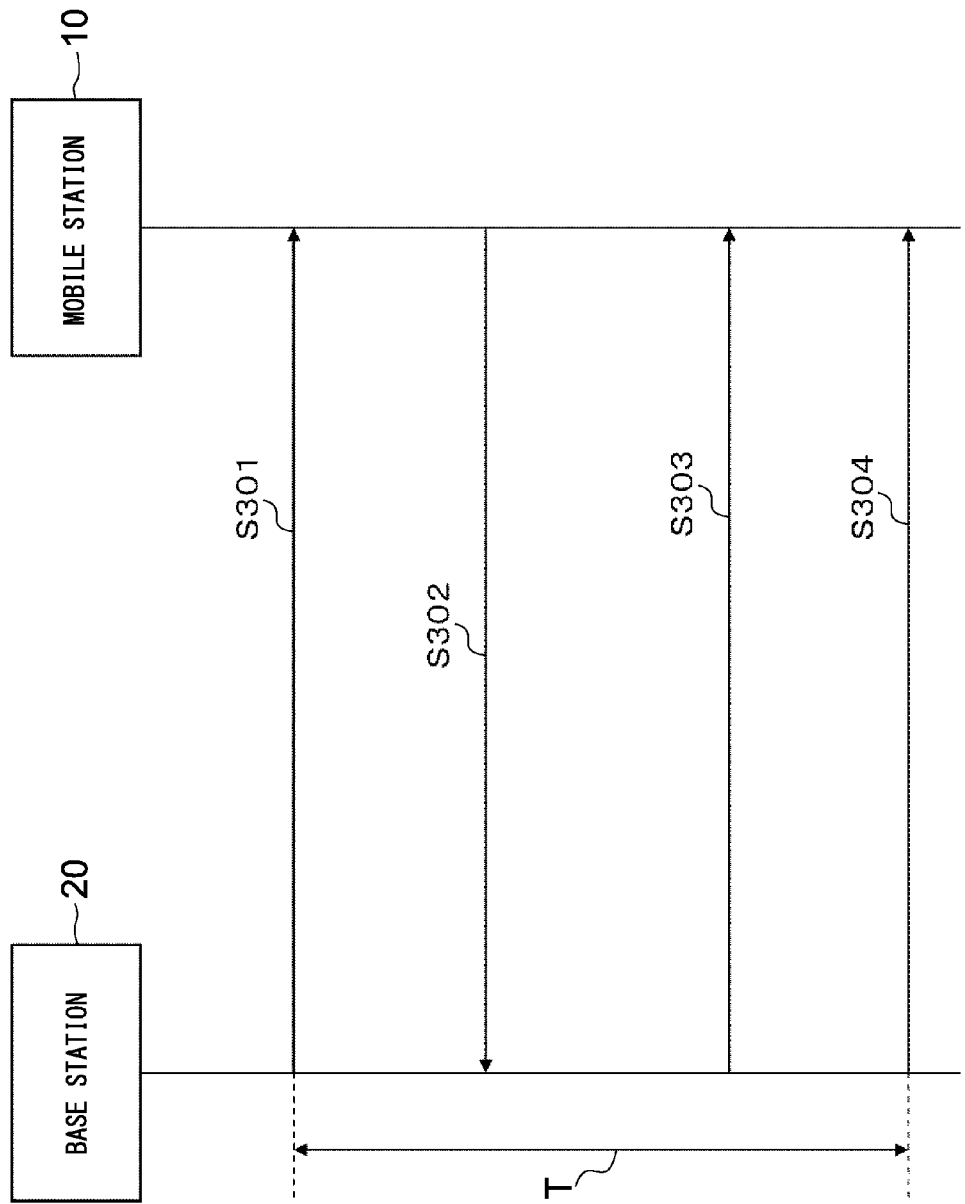
FIG. 6 is a sequence diagram for describing an operation of a communication system according to the first exemplary embodiment of the present invention.

FIG. 6 shows a sequence diagram for describing an operation of the communication system according to the first exemplary embodiment of the present invention. The base station 20 notifies (transmits to) the mobile station 10 of an alert at a predetermined period T, using the first channel C1 (step S301). The mobile station 10 receives the alert using the first channel C1. If decoding of the alert has not succeeded, the mobile station 10 transmits alert reception information to the base station 20 (step S302). In the case where alert reception information has been received, the base station 20 notifies (transmits to) the mobile station 10 of an alert, using the first channel C1 (step S303). Moreover, the base station 20 notifies of (transmits) an alert at a constant period T, using the first channel C1 (step S304).

The alert reception information may also be information in which the mobile station 10 explicitly requests an alert transmission with use of the second channel C2. The alert reception information may also be a negative acknowledgment (NACK: negative acknowledge) that indicates reception or decoding of an alert via the first channel C1 as having failed. Moreover, in step S202 of FIG. 5, the mobile station 10 transmits alert reception information. However it is not limited to this type of case. The base station 20 may notify (transmit to) the mobile station 10 of an alert using the second channel C2 when no acknowledgment is made from the mobile station 10.

As described above, the base station 20 of the first exemplary embodiment can not only transmit an alert periodically with use of the first channel C1, but can also perform an alert transmission of the second channel C2 based on alert reception information received from the mobile station 10. As a result, in the case where the mobile station 10 fails to receive an alert via the first channel C1, there is no need for waiting to receive an alert until the next opportunity for the base station 20 to perform transmission, that is, until one cycle has elapsed. Accordingly, it is possible to prevent delay in alert reception in the mobile station 10.

[Second Exemplary Embodiment]

A second exemplary embodiment is a modified example of the first exemplary embodiment. In the first exemplary embodiment, an alert notification with use of the first channel C1 is performed in a single segment. In contrast, in the second exemplary embodiment, an alert notification with use of the first channel C1 is performed in several segments. Moreover, in the first exemplary embodiment, alert reception information includes information related to reception of a single segment. In contrast, in the second exemplary embodiment, alert reception information includes information related to reception of all or a part of several segments. In relation to the configuration of alert reception information, notification (transmission) of an alert with use of the second channel C2 is performed also with respect to all or a part of the segments notified (transmitted) via the first channel C1.

Figure 7:
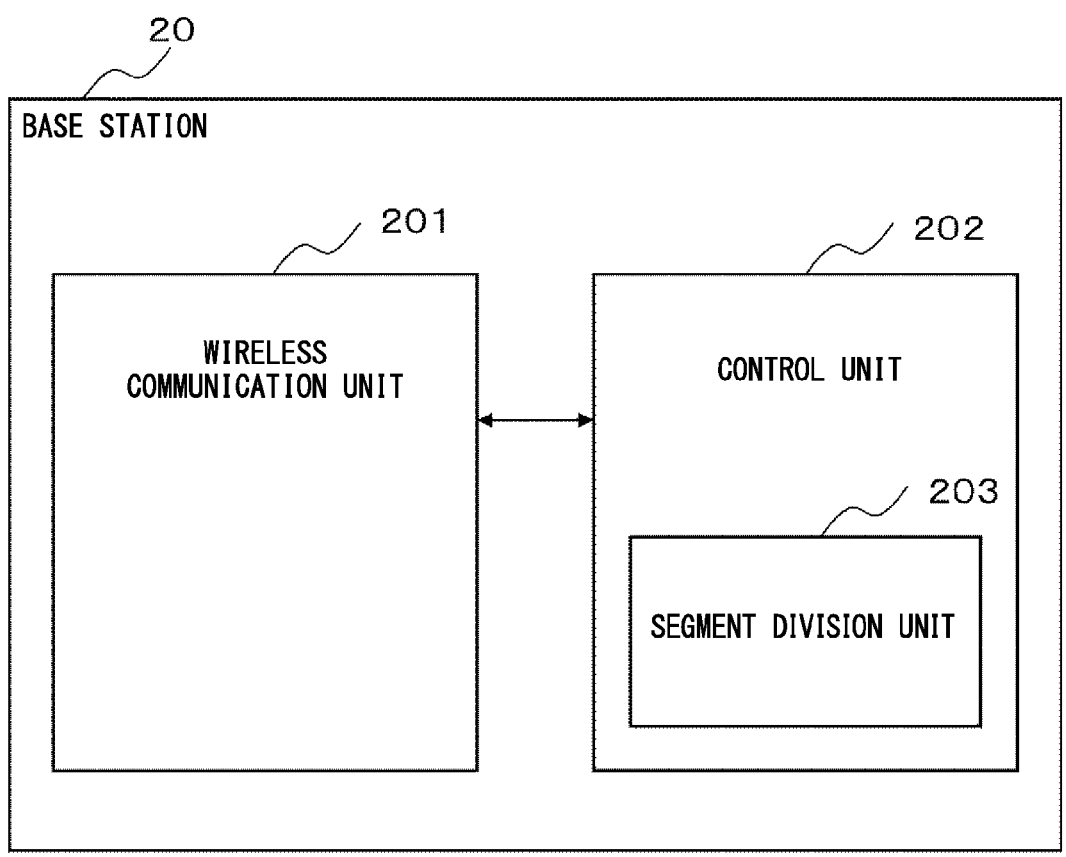
FIG. 7 is a block diagram showing a configuration of a base station according to a second exemplary embodiment of the present invention.

FIG. 7 shows a configuration of the base station 20 in the second exemplary embodiment. The control unit 202 of the base station 20 includes a segment division unit 203. The segment division unit 203 divides an alert into several segments, and transmits each segment of the alert (each of several alert elements) to the wireless communication unit 201. The wireless communication unit 201 of the base station 20 notifies the mobile station 10 of the several segments.

Figure 8:
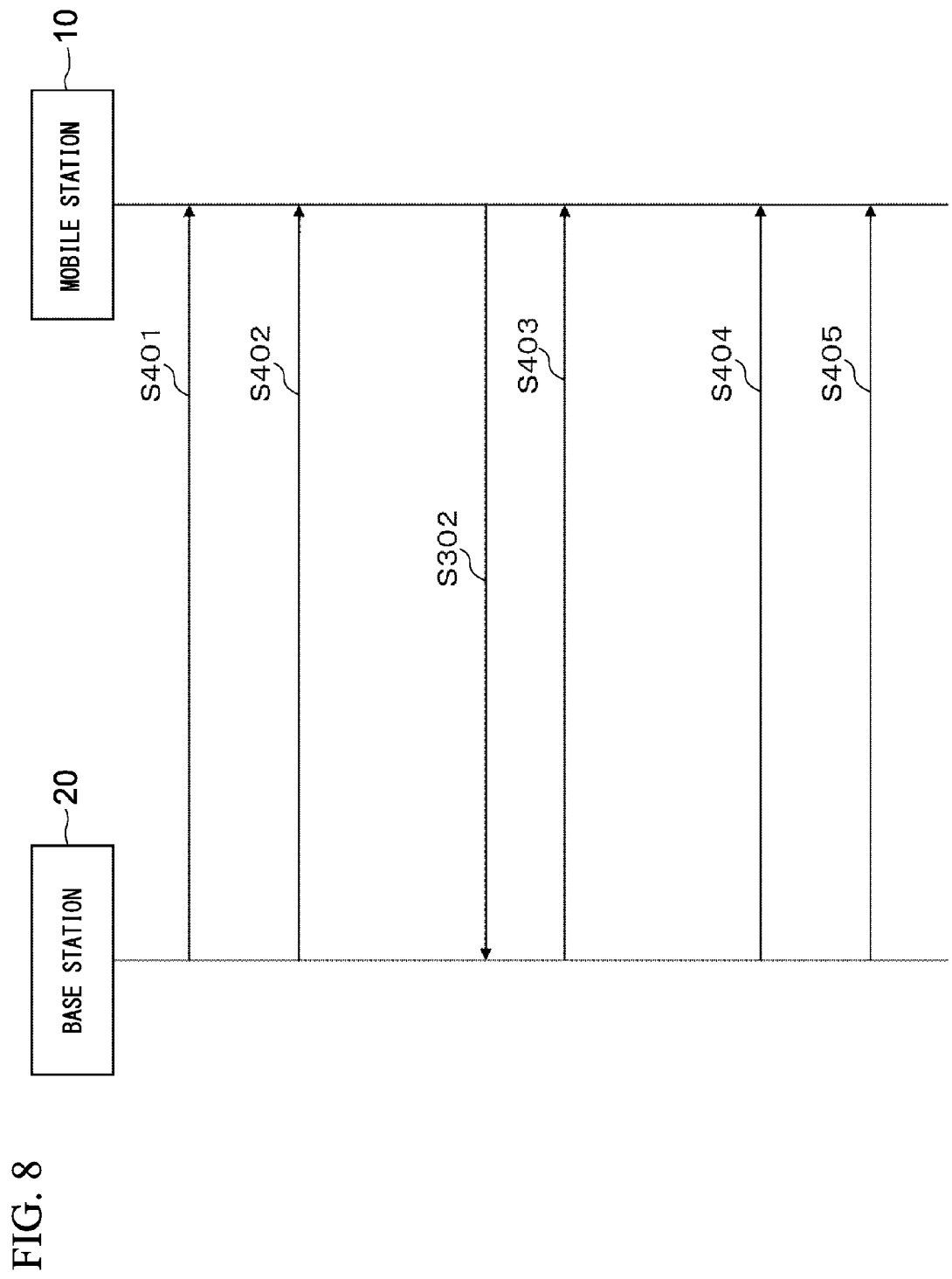
FIG. 8 is a sequence diagram for describing an operation of a communication system according to the second exemplary embodiment of the present invention.

FIG. 8 shows a sequence for describing an operation of the communication system according to the second exemplary embodiment. Description of the same portion of the second exemplary embodiment as that of the first exemplary embodiment is omitted for simplification. In the first exemplary embodiment (refer to FIG. 6), a single alert is transmitted using the first channel C1. In contrast, in the second exemplary embodiment, the control unit 202 of the base station 20 divides an alert into two segments (segment E1 and segment E2), and the wireless communication unit 201 of the base station 20 transmits the two segments using the first channel C1 (step S401, step S402). The control unit 102 of the mobile station 10 decodes the received segment 1 and segment 2. The control unit 102 causes the wireless communication unit 101 to transmit alert reception information that indicates the segment that has not been correctly decoded (step S302). As a specific example, here is described a case where the segment 2 has not been correctly decoded. In this case, the base station 20 performs a notification of the segment indicated by the alert reception information (alert), using the second channel C2 (step S403). Subsequently, the base station 20, at a constant period, performs a notification of the segment E1 with use of the first channel C1 (step S404), and a notification of the segment E2 with use of the first channel C1 (step S405).

In the second exemplary embodiment, there has been described a case where the number of segments is two. However, it is not limited to this. The number of segments may be three or more. If the number of segments is three or more, alert reception information specifies three or less segments. Moreover, in step S302 of the second exemplary embodiment, the alert reception information transmitted from the mobile station 10 to the base station 20 may also be information in which the mobile station 10 explicitly requests an alert transmission via the second channel C2. The alert reception information may also be a negative acknowledgment (NACK: negative acknowledge) that indicates reception or decoding of an alert via the first channel C1 as having failed. The mobile station 10 is not limited to transmit, among the segments received via the first channel C1, information that indicates all of the segments with which reception or decoding failed, in a single piece of alert reception information. The mobile station 10 may change the number of times to transmit alert reception information, according to the number of segments with which reception or decoding failed. For example, the mobile station 10 may generate and transmit a single piece of alert reception information for each of the segments with which reception or decoding failed.

As described above, the base station 20 in the second exemplary embodiment can prevent delays in alert reception in the mobile station 10 as with the first exemplary embodiment. Furthermore, the mobile station 10 transmits alert reception information that indicates the segments with which reception or decoding failed, among the segments (alerts) received via the first channel C1. Accordingly, there is no need for the base station 20 to perform a notification of the segments with which decoding succeeded (alerts) via the second channel C2. As a result, it is possible to improve the level of efficiency in wireless resource utilization.

[Third Exemplary Embodiment]

In a third exemplary embodiment, among several types of alerts, a flag is set to an alert that should be notified via the second channel C2, and the flag is used for determining whether or not a notification via the second channel C2 is required.

Figure 9:
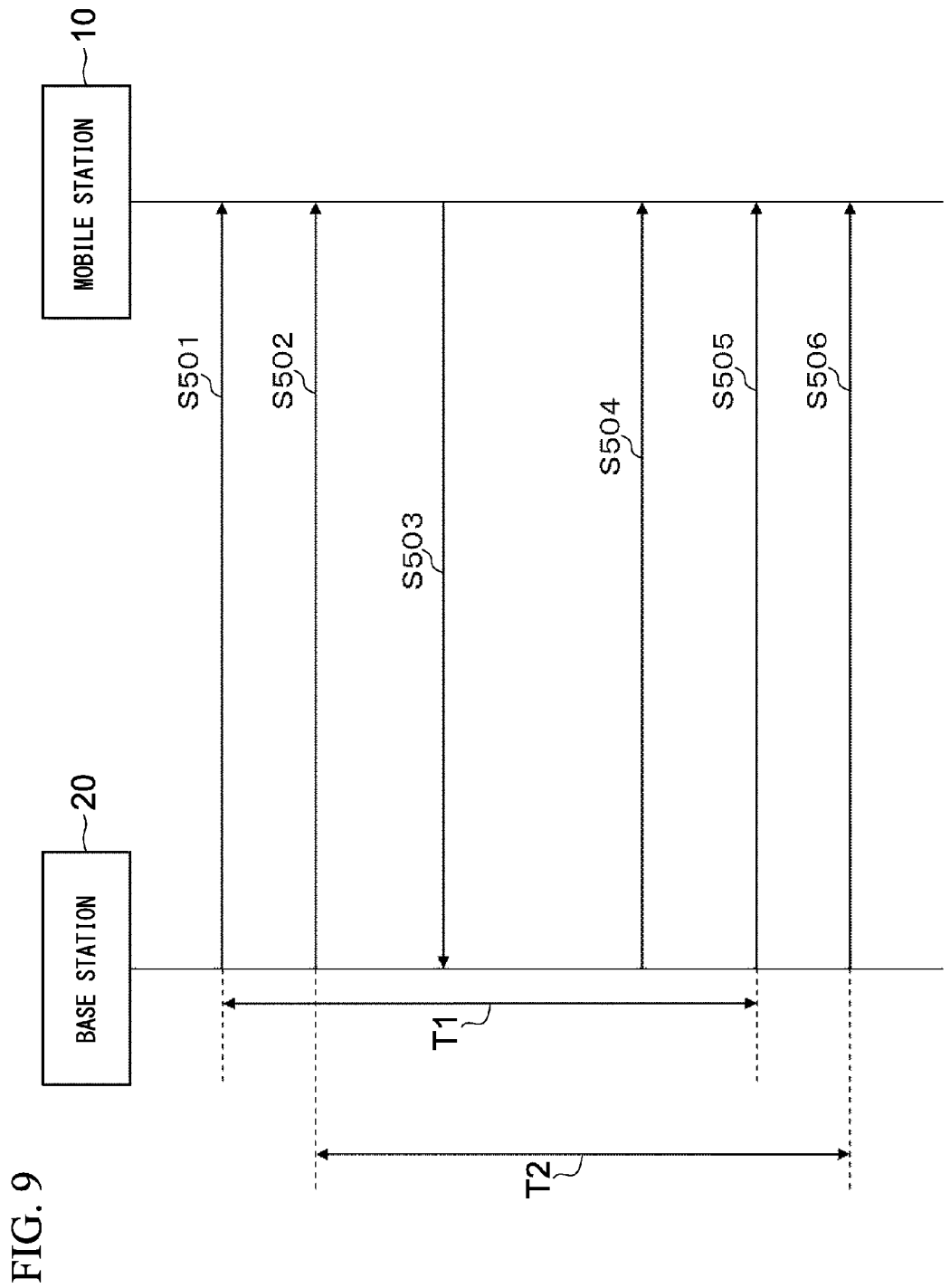
FIG. 9 is a sequence diagram for describing an operation of a communication system according to a third exemplary embodiment of the present invention.

FIG. 9 shows a sequence for describing an operation of the communication system in the third exemplary embodiment. As shown in FIG. 9, in the third exemplary embodiment, the base station 20 transmits two types of alerts. Specifically, the base station 20 transmits a first type alert Y1 using the first channel C1 (step S501), and transmits a second type alert Y2 using the first channel C1 (step S502). Here, in the case where the alert includes a flag, then when decoding of the alert does not succeed in the mobile station 10, a request of a transmission of the alert via the second channel C2 is required. On the other hand, in the case where the alert does not include a flag, then when decoding of the alert does not succeed in the mobile station 10, a request of a transmission of the alert via the second channel C2 is not required. That is to say, the flag is used to determine whether or not the alert needs to be notified via the second channel C2. In step S501, the control unit 202 of the base station 20 adds the flag to the alert Y1. On the other hand, in step S502, the control unit 202 does not add the flag to the alert Y2. As a specific example, here is described a case where decoding has not succeeded with either the alert Y1 or the alert Y2 in the mobile station 10. In this case, the mobile station 10 transmits, to the base station 20, the information that includes the flag, that is, alert reception information that indicates the alert Y1 (step S503). In response to the reception of the alert reception information indicating the alert Y1, the base station 20 performs a notification of the alert Y1 via the second channel C2 (step S504). The base station 20 periodically transmits two types of alerts. Specifically, the base station 20 transmits a first type alert Y1 in each cycle T1 using the first channel C1 (step S505), and transmits a second type alert Y2 in each cycle T2 using the first channel C1 (step S506).

Figure 10:
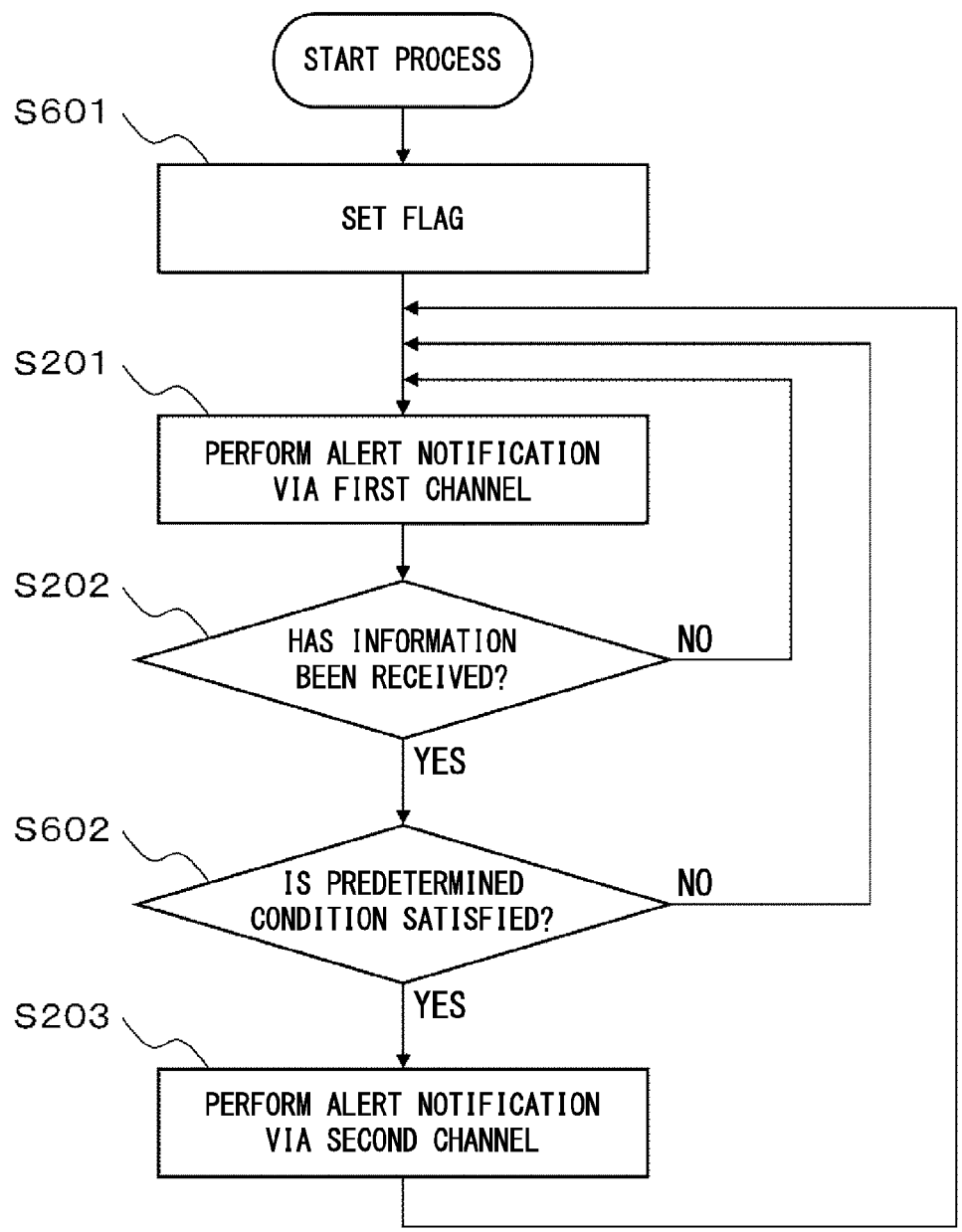
FIG. 10 is a flowchart showing an operation of a base station according to the third exemplary embodiment of the present invention.

FIG. 10 shows a flowchart for describing an operation of the base station 20 in the third exemplary embodiment. Description of the same portion of the third exemplary embodiment as that of the first exemplary embodiment is omitted for simplification. The flowchart shown in FIG. 9 differs from FIG. 5 (first exemplary embodiment) in that there are included step S601 and step S602. In step S601, the control unit 202 of the base station 20 selects, for each alert, whether or not to set a flag. In step S602, the control unit 202 determines whether the alert indicated by the alert reception information from the mobile station 10 is an alert with a flag added thereto. If the alert indicated by the alert reception information is an alert with a flag added thereto, in step S203, the control unit 202 causes the wireless communication unit 201 to perform a notification of the alert using the second channel C2. As described later, the mobile station 10 determines the presence or absence of a flag when transmitting alert reception information. Accordingly, it is also possible not to include the process of step S602.

The flag added to an alert is set according to the degree of priority of the alert, the transmission period of the alert, and the degree of wireless resource usage. For example, a flag may be set in the following first through third cases.

The first case is a case where the degree of priority of the alert exceeds a first threshold value.

The second case is a case where the transmission period of the alert exceeds a second threshold value.

The third case is a case where the degree of wireless resource usage is below a third threshold value.

The degree of priority of the alert, the transmission period of the alert, and the degree of wireless resource usage may be set by an upper level device such as the MME 30, and they may be retained by the base station 20 as station data. Moreover, flag setting may be fixed or variable. For example, by making flag setting variable depending on the degree of wireless resource usage, a notification of an alert via the second channel C2 may not be performed when the resource used by the base station 20 for services other than alerts exceeds the third threshold value.

Figure 11:
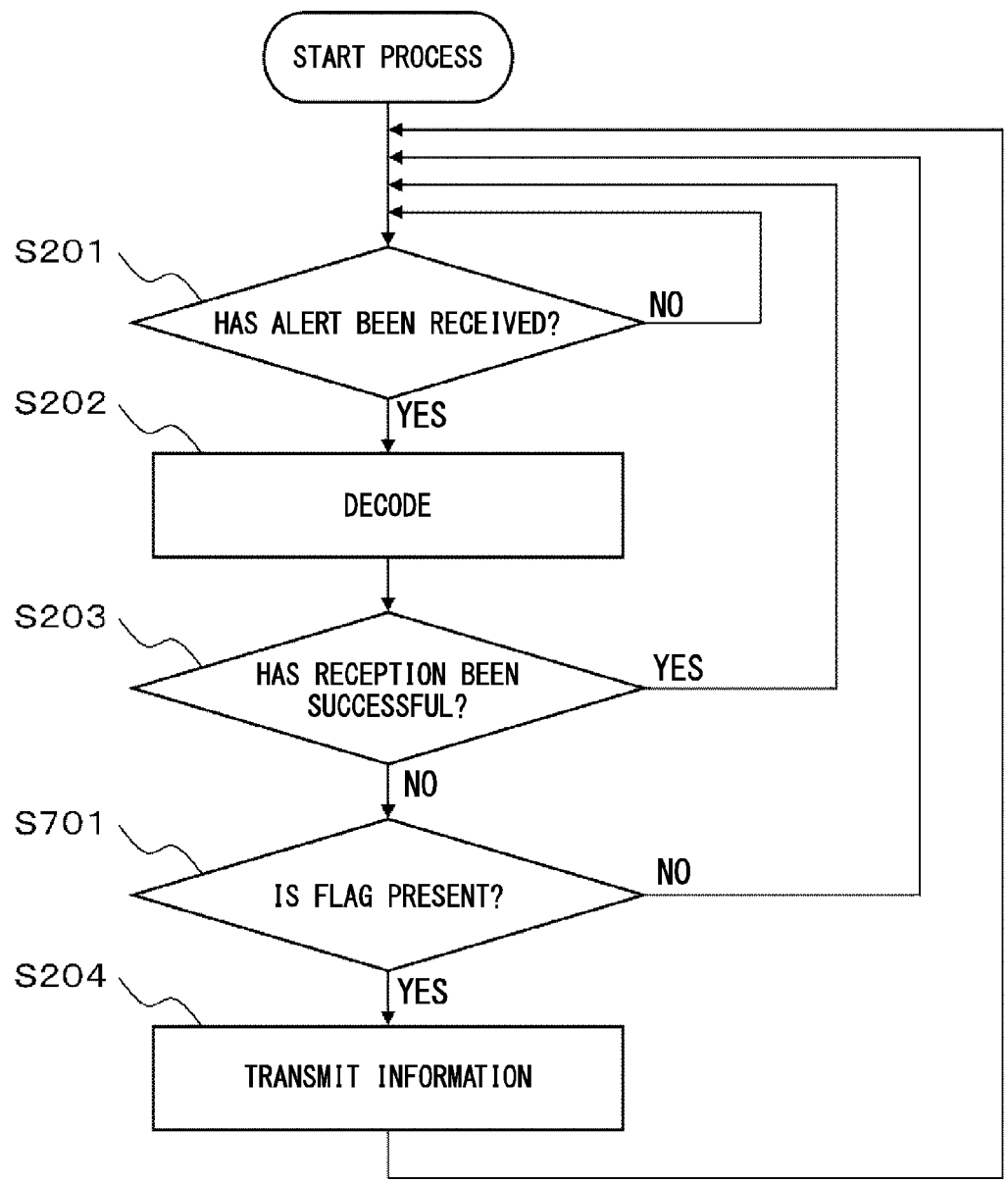
FIG. 11 is a flowchart showing an operation of a mobile station according to the third exemplary embodiment of the present invention.

FIG. 11 shows a flowchart for describing an operation of the mobile station 10 in the third exemplary embodiment. Description of the same portion of the third exemplary embodiment as that of the first exemplary embodiment is omitted for simplification. The flowchart of FIG. 11 differs from FIG. 6 (first exemplary embodiment) in that there is included a step S701. In step S701, the control unit 102 of the mobile station 10 determines whether or not a flag is set for each alert with which reception and decoding have been performed. If a flag is set for the alert ("YES" in step S701), the control unit 102 causes the wireless communication unit 101 to transmit, to the base station 20, alert reception information that indicates the alert. If a flag is not set for the alert ("NO" in step S701), the control unit 102 returns to step S101 and waits to receive an alert.

In the above description, the third exemplary embodiment is described based on the first exemplary embodiment. The third exemplary embodiment may also be applied to a case as with the second exemplary embodiment where an alert is divided into several segments and the several segments are transmitted.

As described above, the base station 20 in the third exemplary embodiment can prevent delays in alert reception in the mobile station 10, as with the first exemplary embodiment. Furthermore, with use of a flag, it is possible to specify an alert that needs to be transmitted via the second channel C2. As a result, it is possible to improve the level of efficiency in wireless resource utilization.

[Fourth Exemplary Embodiment]

The base station 20 according to a fourth exemplary embodiment does not set a flag as practiced in the third exemplary embodiment. On the other hand, the base station 20 according to the fourth exemplary embodiment determines upon receiving alert reception information, whether to perform a notification of an alert via the second channel C2.

Figure 12:
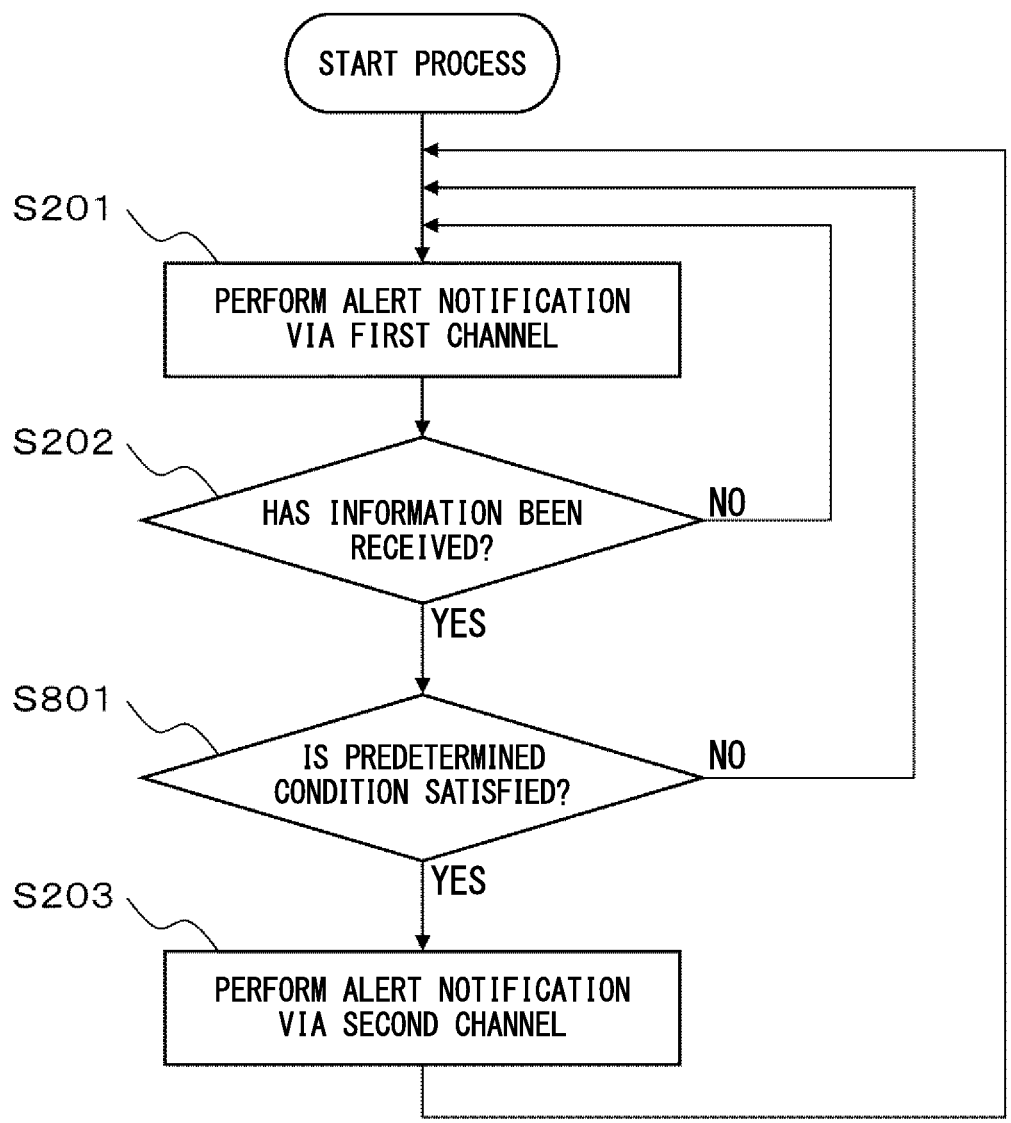
FIG. 12 is a flowchart showing an operation of a base station according to a fourth exemplary embodiment of the present invention.

FIG. 12 shows a flowchart for describing an operation of the base station 20 according to the fourth exemplary embodiment. Description of the same portion of the fourth exemplary embodiment as that of the third exemplary embodiment is omitted for simplification. In the flowchart shown in FIG. 10 according to the third exemplary embodiment, there is included a step S601 of selecting whether or not the base station 20 sets a flag for each alert. In contrast, in the flowchart shown in FIG. 12 according to the fourth exemplary embodiment, the step S601 is not included and a step S801 is included. In step S801, the base station 20 determines upon receiving alert reception information, whether to perform an alert transmission via the second channel C2, according to a predetermined condition. The predetermined condition may, as described in the third exemplary embodiment, include the degree of priority of the alert, the transmission period of the alert, and the degree of wireless resource usage. Here is described a case where the predetermined condition is whether or not the resource used by the base station 20 for services other than alerts exceeds the third threshold value. In this case, if the resource exceeds the third threshold value, the base station 20 does not perform an alert notification via the second channel C2 even if alert reception information is received from the mobile station 10.

[Fifth Exemplary Embodiment]

In a fifth exemplary embodiment, an alert is divided into several segments and the several segments are transmitted as with the third exemplary embodiment. Hereunder, as an example, a communication system with CMAS applied thereto is described in detail. A notification channel is used as the first channel C1, and an individual channel or a common channel is used as the second channel C2. More specifically, the notification channel is a BCCH, and the individual channel and the common channel are DCCH (dedicated control channel) or CCCH (common control channel).

Figure 13:
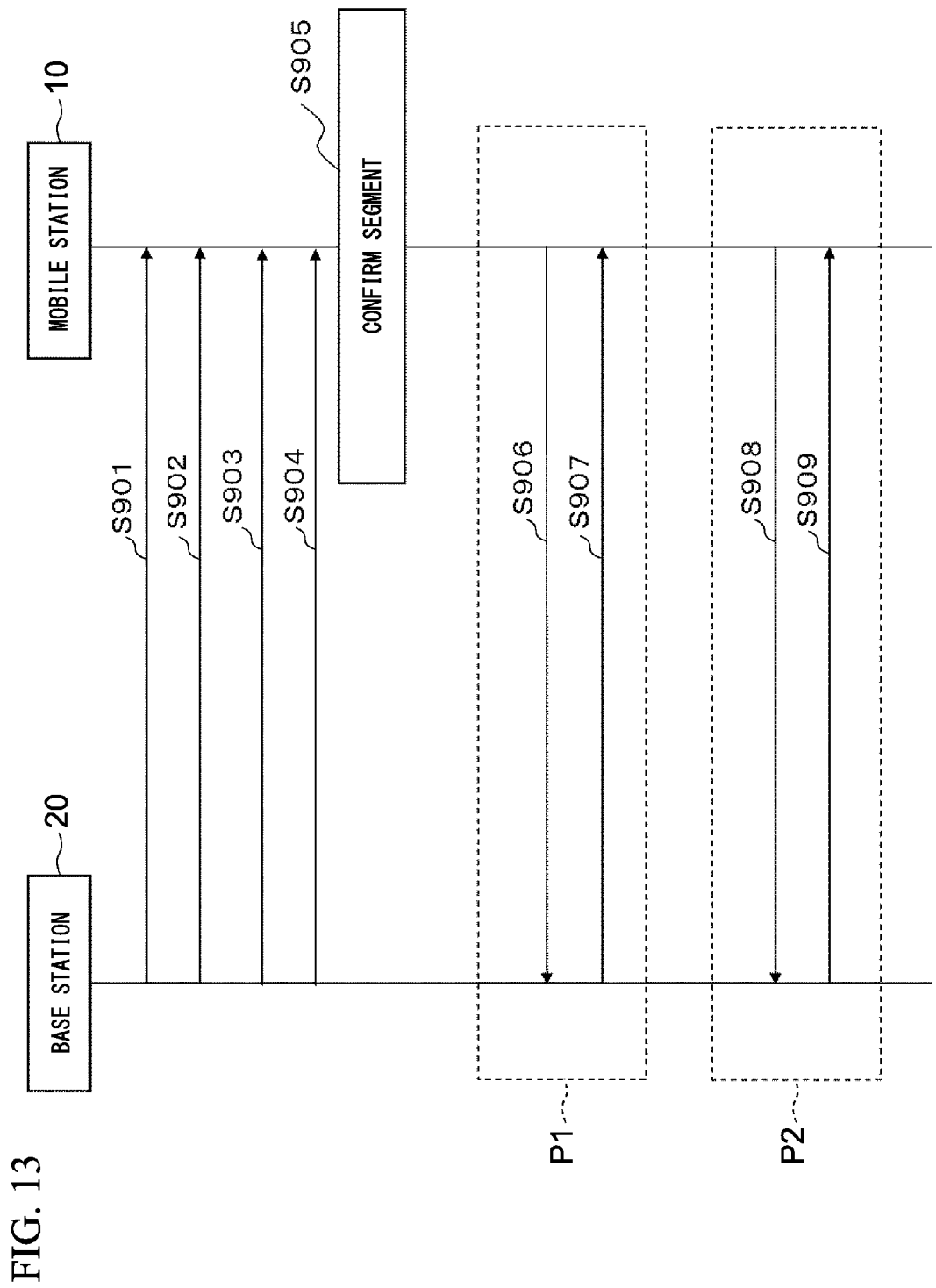
FIG. 13 is a sequence diagram for describing an operation of a communication system according to a fifth exemplary embodiment of the present invention.
Figure 14:
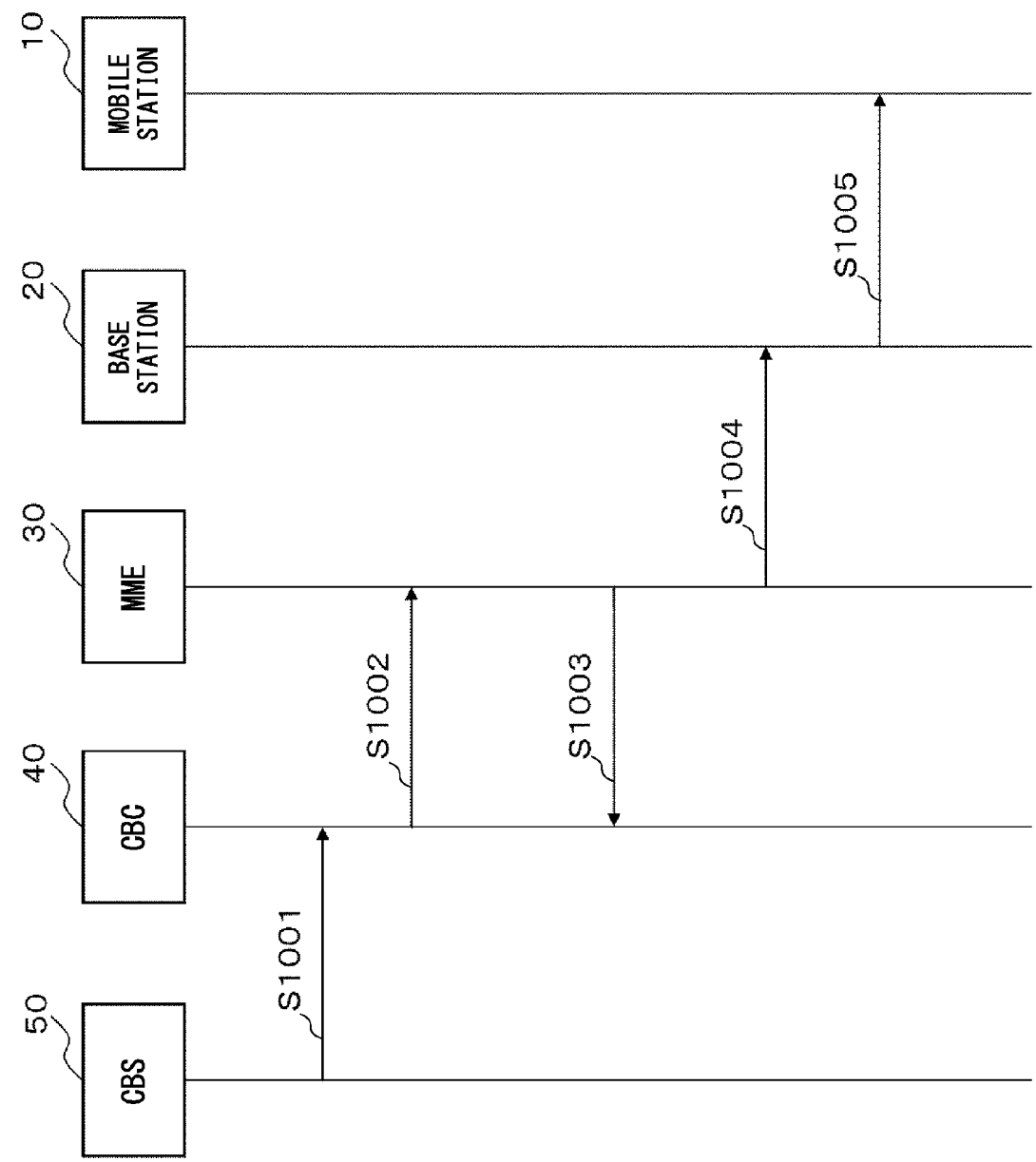
FIG. 14 is a flowchart showing a sequence of notifying an alert with PWS.

FIG. 13 shows a sequence for describing an operation of the communication system according to the fifth exemplary embodiment. The control unit 202 of the base station 20 divides an alert into four segments, and the communication unit 201 of the base station 20 uses the BCCH to perform an alert notification to the mobile station 10. More specifically, the control unit 202 divides an alert into four segments, namely, E1, E2, E3, and E4. The communication unit 201 uses the BCCH to perform a notification of the segment E1 of the alert to the mobile station 10 (step S901). The communication unit 201 uses the BCCH to perform a notification of the segment E2 of the alert to the mobile station 10 (step S902). The communication unit 201 uses the BCCH to perform a notification of the segment E3 of the alert to the mobile station 10 (step S903). The communication unit 201 uses the BCCH to perform a notification of the segment E4 of the alert to the mobile station 10 (step S904). The base station 20 uses an SIB 12 of the BCCH when performing a notification of the alert that has been divided into these segments. An SIB 12 is also called CMAS notification, and it is used regardless of the level of priority. The base station 20 may be configured so that an alert to be notified includes information such as a flag, transmission time (time for transmission), and the number of segments (num of segment).

A flag indicates that an alert or segment transmission is performed via the DCCH or CCCH from the base station 20 when decoding of an alert or segment notified via the BCCH fails. In the case where a flag is set per alert unit, the priority degree is decided per alert unit. An example of the priority degree is an emergency degree. As described in the third exemplary embodiment, the priority degree may be set based on the transmission period of the alert and the degree of wireless resource usage. Moreover, the base station 20 may set (or may not set) a flag commonly for all of the segments obtained as a result of dividing a single alert (four segments in this example). In the case where a flag is commonly set for all of the segments of a given single alert, the mobile station 10 can determine a flag being set for the alert by receiving only a single segment.

A transmission time (time for transmission) is a length of time required for transmitting all of the segments obtained as a result of dividing a single alert (four segments in this example). When this transmission time has elapsed, the mobile station 10, if all of the segments have not been received, may determine that there is a segment that has not been successfully received, and may request the base station 20 to transmit the segment via the DCCH or the CCCH.

The number of segments indicates the number of segments that have been obtained as a result of dividing a single alert. In the case where the number of segments is notified, the mobile station 10 can identify which segment has not been received. All of the segments obtained as a result of dividing a single alert may include information of the number of segments. In this case, even if reception of the last segment fails, it is still possible to identify the segment, reception of which has failed, based on the number of segments. As an alternative method, among the segments obtained as a result of dividing a single alert, only the segment that is transmitted last may include information of the number of segments.

The mobile station 10 receives and decodes the segments notified in step S901 to step S904, and confirms these segments (step S905). Segment confirmation is performed based on a flag, transmission time, and segment number described above. More specifically, the mobile station 10 determines based on the number of segments, whether all of the number of segments have been received and correctly decoded. If there is a segment that has not been received or has not been correctly decoded, the mobile station 10 confirms the flag of the segments that have been correctly decoded. If the flag is set to the segments that have been correctly decoded, the mobile station 10 requests the base station 20 to transmit the segment that has not been received or has not been correctly decoded. In this example, here is described a case where the mobile station 10 has not received or has not correctly decoded the segment E3. If the flag is not included in the segment that has been correctly decoded, there is no need for the process of requesting a transmission of the segment that has been received or has been correctly decoded.

This segment re-transmission request process differs according to the state of the mobile station 10. In FIG. 13, the option P1 indicates a case where the mobile station 10 is in the active, and the option P2 indicates a case where the mobile station 10 is in the idle.

Here is described a case where the mobile station 10 fails to receive the segment E3 as described above in the case of the option P1. In this case, the mobile station 10 notifies the base station 20 with use of the DCCH, to transmit the segment E3 (step S906). This notification may be performed using an existing RRC message such as RRC connection setup complete, or may be performed using a new message that has not been defined currently. When performing the notification, the message may include a message identifier, a serial number, and parameters of the segment number for which reception has failed. The serial number is a sequential serial number related to a segment or an alert.

In the case where the transmission request transmitted in step S906 has been received, the base station 20 transmits the segment E3 via the DCCH (step S907).

Here is described a case where reception of the segment E3 has failed in the case of the option P2. In this case, the mobile station 10 notifies the base station 20 with use of the CCCH to transmit the segment E3 (step S908). The parameters included in the notification or in the message for performing the notification are similar to those in the case of the option P1.

In the case where the transmission request transmitted in step S908 has been received, the base station 20 transmits the segment E3 via the CCCH (step S909).

In the fifth exemplary embodiment, there has been described a case where an alert is divided into four segments. However, it is not limited to this. An alert may be divided into three or less or five or more segments. The above description has been made based on the third exemplary embodiment. However, it is not limited to this. The fifth exemplary embodiment may also be applied to the first, second, and fourth exemplary embodiment. The communication system with CMAS applied thereto has been described above. However, it is not limited to CMAS. ETWS may also be applied to the communication system. In the case of applying ETWS, the base station 20 uses an SIB 10 or an SIB 11 instead of the SIB 12 to perform an alert notification. An SIB 10 is also called an ETWS primary notification, and it is applied in a case with a high degree of emergency such as an initial report in the event of an earthquake. An SIB 11 is also called an ETWS secondary notification, and it is applied in a case with a degree of emergency higher than that of an SIB 10, such as a secondary disaster in the event of an earthquake. It is possible to apply not only an SIB 10 or SIB 11, but also another SIB the emergency degree of which is lower. Each SIB is notified at a period prescribed in si-Periodicity defined in Non-Patent Document 3.

In the fifth exemplary embodiment, the notification channel is described as a BCCH, and the individual channel and the common channel are described as DCCH (dedicated control channel) or CCCH (common control channel). However, it is not limited to this, and they may be other channels. Moreover, there has been described a case where the types of the first channel C1 and the second channel C2 differ from each other. However, it is not limited to this. The first channel C1 and the second channel C2 may be of the same type.

Furthermore, each operation of the communication system described in the first through fifth exemplary embodiments may be controlled by a device included in the communication system shown in FIG. 3 and FIG. 4, or by a CPU (central processing unit) of another device capable of communicating with the device. In this case, it may be achieved by preparing a recording medium that records the program code of the software for realizing the functions of the respective exemplary embodiments, and by a CPU or a general-purpose computer reading the program code stored on the recording medium to operate.

The recording medium that supplies the program may memorize the above program, and it may be, for example, a CD-ROM (compact disc read only memory), a DVD-R (digital versatile disk recordable), an optical disk, a magnetic disk, or a nonvolatile memory card.

The type of the base station 20 described in the first through fifth exemplary embodiments is not limited. That is to say, the base station 20 may be any one of a macro base station that constitutes a macro cell, a pico base station that constitutes a pico cell, and a femto base station that constitutes a femto cell (HNB (Home NodeB) or HeNB (Home eNodeB)).

A part or all of the above exemplary embodiments may be disclosed as the following supplementary notes. However, they are not limited to the following.

Supplementary note 1) A base station that communicates with a mobile station, the base station including: a wireless communication unit that transmits an alert periodically to the mobile station using a first channel, the wireless communication unit receiving, from the mobile station, alert reception information related to reception of the alert, the wireless communication unit transmitting at least a part of the alert to the mobile station using a second channel different from the first channel; and a control unit that instructs the wireless communication unit, in response to the alert reception information, to transmit to the mobile station at least a part of the alert using the second channel.

(Supplementary note 2) The base station according to supplementary note 1, wherein the alert reception information includes information that requests transmission of the alert.

(Supplementary note 3) The base station according to supplementary note 1 or 2, wherein the control unit determines based on a predetermined condition, whether to give, to the alert, information for deciding necessity of alert transmission with use of the second channel.

(Supplementary note 4) The base station according to supplementary note 3, wherein the predetermined condition is at least one of: priority degree of the alert; transmission period of the alert; and usage degree of resource used by the base station.

(Supplementary note 5) The base station according to any one of supplementary notes 1 to 4, wherein the wireless communication unit transmits a plurality of types of alerts, using the first channel.

(Supplementary note 6) The base station according to any one of supplementary notes 1 to 5, wherein the control unit includes a segment division unit that divides the alert into a plurality of segments.

(Supplementary note 7) The base station according to supplementary note, wherein the predetermined condition is a degree of convergence of signals transmitted by the base station.

(Supplementary note 8) The base station according to any one of supplementary note 1 through supplementary note 7, wherein the first channel is a notification channel.

(Supplementary note 9) The base station according to supplementary note 8, wherein the notification channel is a BCCH (broadcast control channel).

(Supplementary note 10) The base station according to any one of supplementary note 1 through supplementary note 9, wherein the second channel is an individual channel.

(Supplementary note 11) The base station according to supplementary note 10, wherein the individual channel is a DCCH (dedicated control channel).

(Supplementary note 12) The base station according to any one of supplementary note 1 through supplementary note 9, wherein the second channel is a common channel.

(Supplementary note 13) The base station according to supplementary note 10, wherein the common channel is a CCCH (common control channel).

(Supplementary note 14) A communication method for a base station communicating with a mobile station, the communication method including: transmitting an alert periodically to the mobile station using a first channel; receiving, from the mobile station, alert reception information related to reception of the alert; transmitting at least a part of the alert to the mobile station using a second channel different from the first channel; and instructing the base station, in response to the alert reception information, to transmit to the mobile station at least a part of the alert using the second channel.

(Supplementary note 15) The communication method according to supplementary note 7, wherein the alert reception information includes information that requests transmission of the alert. (Supplementary note 16) The communication method according to either one of supplementary note 14 and supplementary note 15, wherein the necessity of notification via the second channel is determined based on a predetermined condition.

(Supplementary note 17) The communication method according to supplementary note 16, wherein the predetermined condition is a condition related to information notified via the first channel.

(Supplementary note 18) The communication method according to supplementary note 17, wherein the condition related to information notified via the first channel the condition related to information notified via the first channel or the condition related to information notified via the first channel is a priority degree of the information notified via the first channel.

(Supplementary note 19) The communication method according to supplementary note 17, wherein the condition related to information notified via the first channel is a notification period of the information notified via the first channel.

(Supplementary note 20) The communication method according to supplementary note 16, wherein the predetermined condition is a degree of convergence of signals transmitted by the base station.

(Supplementary note 21) The communication method according to any one of supplementary note 14 through supplementary note 20, wherein the first channel is a notification channel.

(Supplementary note 22) The communication method according to supplementary note 21, wherein the notification channel is a BCCH (broadcast control channel).

(Supplementary note 23) The communication method according to any one of supplementary note 14 through supplementary note 22, wherein the second channel is an individual channel.

(Supplementary note 24) The communication method according to supplementary note 23, wherein the individual channel is a DCCH (dedicated control channel).

(Supplementary note 25) A base station according to any one of supplementary note 14 through supplementary note 22, wherein the second channel is a common channel.

(Supplementary note 26) A mobile station that communicates with a base station, the mobile station including: a wireless communication unit that receives an alert periodically from the base station using a first channel, the wireless communication unit transmitting, to the base station, alert reception information related to reception of the alert, the wireless communication unit receiving at least a part of the alert from the base station using a second channel different from the first channel; and a control unit that decodes the alert, the control unit determining whether the alert is correctly decoded, the control unit instructing the wireless communication unit to transmit the alert reception information to the base station in a case of the control unit determining that the alert is correctly decoded.

(Supplementary note 27) A wireless communication system that includes a base station and a mobile station, the base station including: a wireless communication unit that transmits an alert periodically to the mobile station using a first channel, the wireless communication unit receiving, from the mobile station, alert reception information related to reception of the alert, the wireless communication unit transmitting at least a part of the alert to the mobile station using a second channel different from the first channel; and a control unit that instructs the wireless communication unit, in response to the alert reception information, to transmit to the mobile station at least a part of the alert using the second channel.

(Supplementary note 28) A program that causes a computer to execute: transmitting an alert periodically to a mobile station using a first channel; receiving, from the mobile station, alert reception information related to reception of the alert; transmitting at least a part of the alert to the mobile station using a second channel different from the first channel; and instructing the base station, in response to the alert reception information, to transmit to the mobile station at least a part of the alert using the second channel.

This application is based upon and claims the benefit of priority from Japanese patent application No. 2012-281977, filed on Dec. 26, 2012, the disclosure of which is incorporated herein in its entirety by reference.

INDUSTRIAL APPLICABILITY

The present invention may also be applied to a base station, a communication method, and a mobile station.

REFERENCE SYMBOLS

10 Mobile station
20 Base station
30 MME
40 CBC
50 CBS
101 Wireless communication unit
102 Control unit
201 Wireless communication unit
202 Control unit
203 Segment division unit

The invention claimed is:

1. A warning system for earthquakes, tsunamis and commercial mobile alerts, comprising:
a core network comprising a mobility management entity, a cell broadcast center and a cell broadcast service;
at least one mobile station comprising a mobile station control unit and a mobile station wireless communication unit having a first frequency band and a second frequency band; and
a base station, station comprising a base station control unit and a base station wireless communication unit having a segment division unit, the first frequency band and the second frequency band, and the base station communicates with the mobility management entity via an interface, wherein
the base station wireless communication unit periodically transmits an alert to the at least one mobile station using the first frequency band, the alert including a flag requiring the at least one mobile station to request transmission of the alert via the second frequency band when decoding of the alert does not succeed in the at least one mobile station, the base station wireless communication unit receiving, from the mobile station, alert reception information, the base station wireless communication unit transmitting the alert to the at least one mobile station using the second frequency band; and
the control unit of the base station instructs the base station wireless communication unit, in response to the alert reception information, to transmit the alert to the at least one mobile station using the second frequency band.

2. The warning system according to claim 1, wherein the alert reception information includes information that requests transmission of the alert.

3. The warning system according to claim 2, wherein the base station control unit determines whether to add the flag to the alert based on a predetermined condition.

4. The warning system according to claim 2, wherein the base station wireless communication unit transmits a plurality of different alerts, using the first frequency band.

5. The warning system according to claim 2, wherein the segment division unit divides the alert into a plurality of segments.

6. The warning system according to claim 1, wherein the base station control unit determines whether to add the flag to the alert based on a predetermined condition.

7. The warning system according to claim 6, wherein the predetermined condition is at least one of: priority degree of the alert; transmission period of the alert; and usage degree of resource used by the base station.

8. The warning system according to claim 7, wherein the base station wireless communication unit transmits a plurality of different alerts, using the first frequency band.

9. The warning system according to claim 7, wherein the segment division unit divides the alert into a plurality of segments.

10. The warning system according to claim 6, wherein the base station wireless communication unit transmits a plurality of different alerts, using the first frequency band.

11. The warning system according to claim 6, wherein the segment division unit divides the alert into a plurality of segments.

12. The warning system according to claim 1, wherein the base station wireless communication unit transmits a plurality of different alerts, using the first frequency band.

13. The warning system according to claim 1, wherein the segment division unit divides the alert into a plurality of segments.

14. A method for warning for earthquakes, tsunamis and commercial mobile alerts, comprising:
providing a core network comprising a mobility management entity, a cell broadcast center and a cell broadcast service; at least one mobile station comprising a mobile station control unit and a mobile station wireless communication unit having a first frequency band and a second frequency band; and a base station, station comprising a base station control unit and a base station wireless communication unit having a segment division unit, the first frequency band and the second frequency band, and the base station communicates with the mobility management entity via an interface,
transmitting an alert periodically to the at least one mobile station using a first frequency band, the alert including a flag requiring the at least one mobile station to request transmission of the alert via a second channel when decoding of the alert does not succeed in the at least one mobile station, the second frequency band being different from the first frequency band;
receiving, from the mobile station, alert reception information related to reception of the alert;
transmitting the alert to the mobile station using the second frequency band; and
instructing the base station, in response to the alert reception information, to transmit the alert to the at least one mobile station using the second frequency band.

15. The method for warning according to claim 14, wherein the alert reception information includes information that requests transmission of the alert.

16. A warning system for earthquakes, tsunamis and commercial mobile alerts, comprising:
a core network comprising a mobility management entity, a cell broadcast center and a cell broadcast service;
at least one mobile station comprising a mobile station control unit and a mobile station wireless communication unit having a first frequency band and a second frequency band; and
a base station, station comprising a base station control unit and a base station wireless communication unit having a segment division unit, the first frequency band and the second frequency band, and the base station communicates with the mobility management entity via an interface, wherein
the wireless communication unit of the at least one mobile station periodically receives an alert using the first frequency band, the alert including a flag requiring the mobile station to request transmission of the alert via a second frequency band when decoding of the alert does not succeed in the at least one mobile station, the second frequency band being different from the first frequency band, the wireless communication of the at least one mobile station unit transmitting, to the base station, alert reception information related to reception of the alert, the wireless communication unit of the at least one mobile station receiving the alert from the base station using the second frequency band; and
the control unit of the base station controls the alert, the control unit of the base station determining whether the alert is correctly decoded, the control unit instructing the wireless communication unit to transmit the alert of the base station reception information to the base station in a case of the control unit of the base station determining that the alert is not correctly decoded.

17. The warning system according to claim 16, wherein the alert reception information includes information that requests transmission of the alert.

* * * * *